No. 886,898.

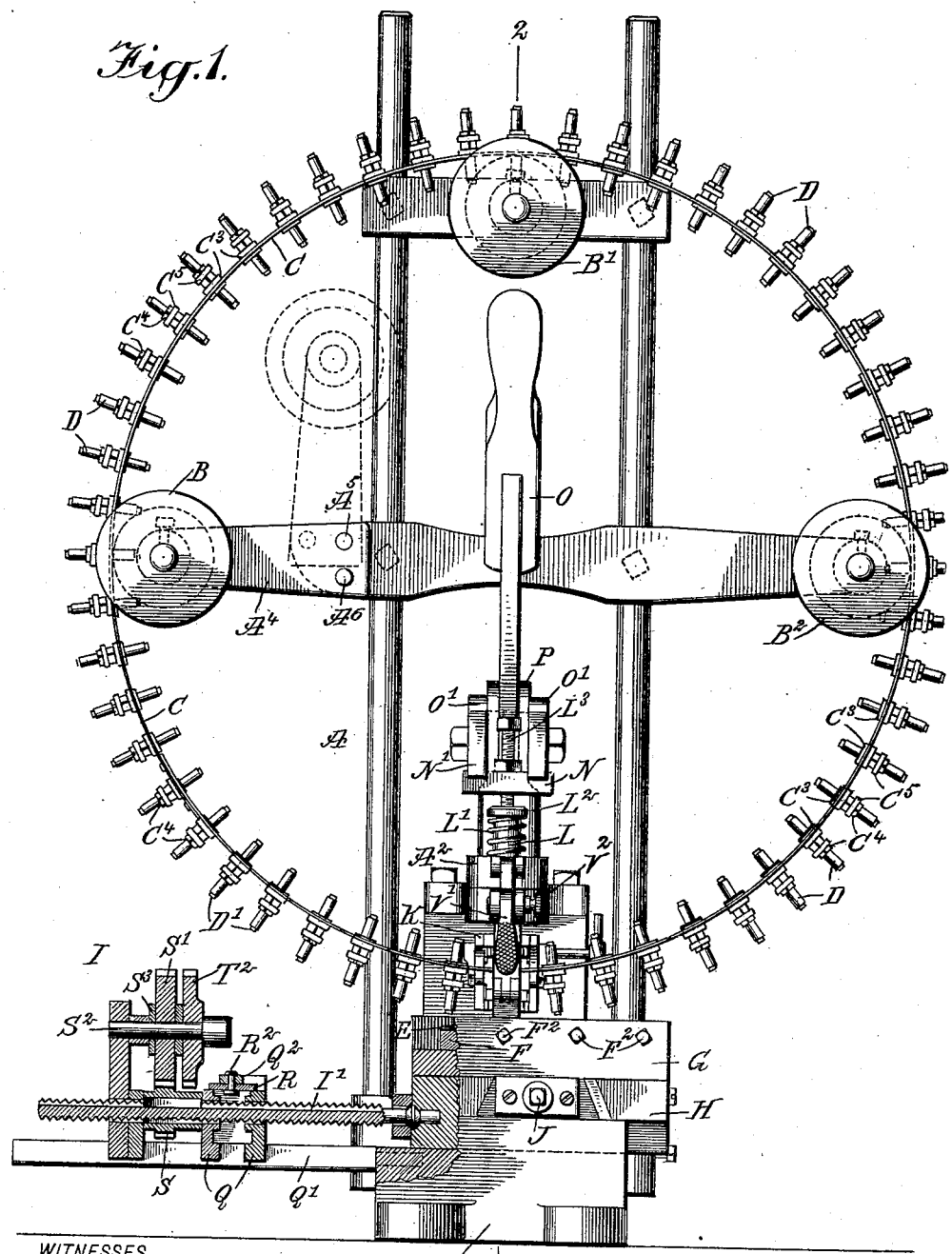

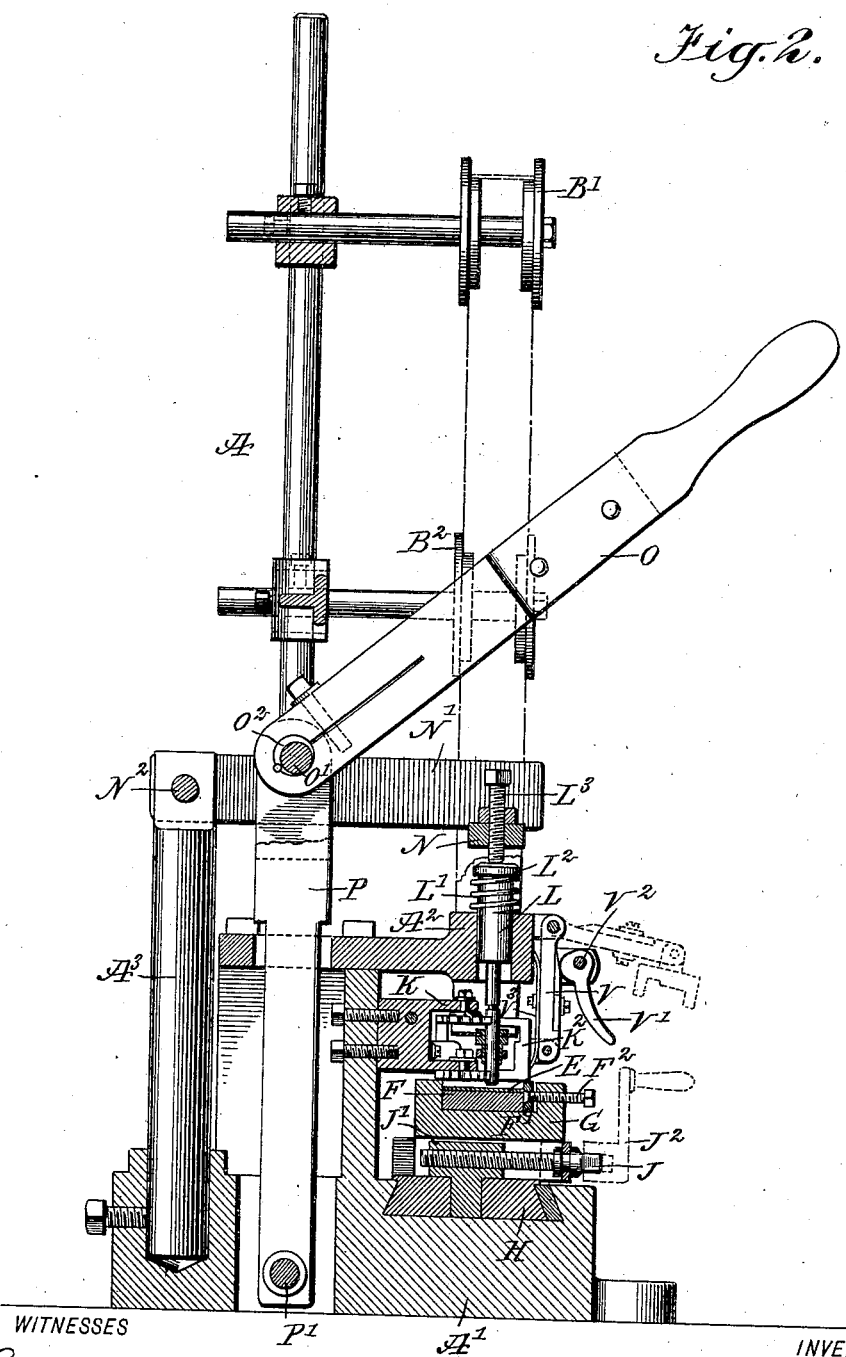

PATENTED MAY 5, 1908.

R. TURNER & B. R. CORLEY.
ENGRAVING MACHINE.
APPLICATION FILED JUNE 19, 1907.

4 SHEETS—SHEET 3.

WITNESSES

INVENTORS
Robert Turner
Benjamin R. Corley
BY
ATTORNEYS

No. 886,898. PATENTED MAY 5, 1908.
R. TURNER & B. R. CORLEY.
ENGRAVING MACHINE.
APPLICATION FILED JUNE 19, 1907.
4 SHEETS—SHEET 4.
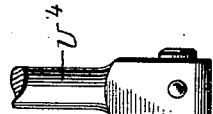
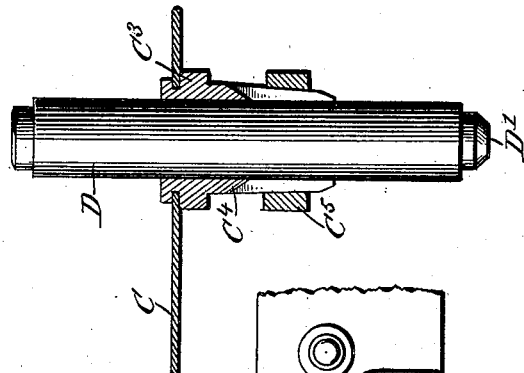
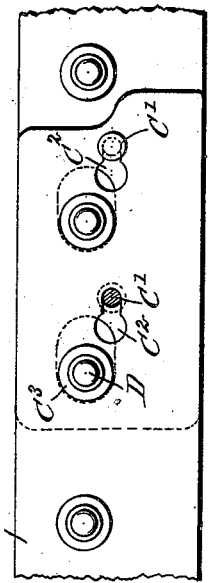
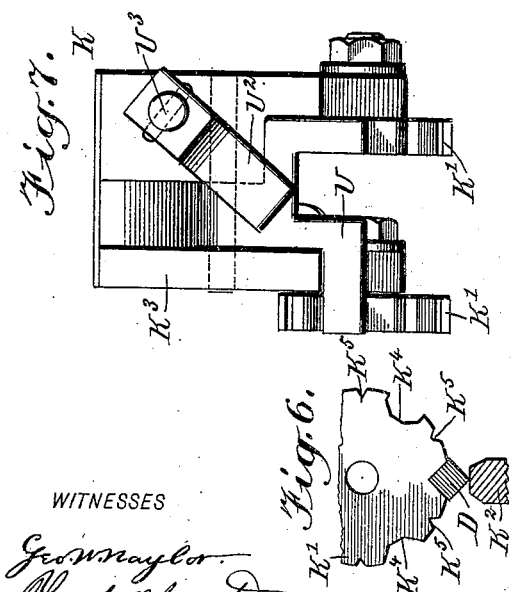
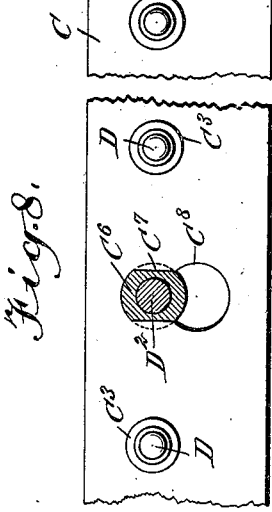
WITNESSES
INVENTORS
Robert Turner
Benjamin R. Corley
BY
ATTORNEYS

UNITED STATES PATENT OFFICE.

ROBERT TURNER, OF NEW CANAAN, CONNECTICUT, AND BENJAMIN R. CORLEY, OF NEW YORK, N. Y.

ENGRAVING-MACHINE.

No. 886,898.      Specification of Letters Patent.      Patented May 5, 1908.

Application filed June 19, 1907. Serial No. 379,758.

*To all whom it may concern:*

Be it known that we, ROBERT TURNER, a subject of the King of Great Britain, and a resident of New Canaan, in the county of Fairfield and State of Connecticut, and BENJAMIN R. CORLEY, a citizen of the United States, and a resident of the city of New York, borough of Brooklyn, in the county of Kings and State of New York, have invented a new and Improved Engraving-Machine, of which the following is a full, clear, and exact description.

The invention relates to plate engraving, and its object is to provide a new and improved engraving machine, arranged to permit of conveniently, accurately and quickly producing sunken letters, signs, numerals, characters and ornaments, and any desired combination thereof, in copper plates, steel plates and the like, and without the use of skilled labor.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 4:
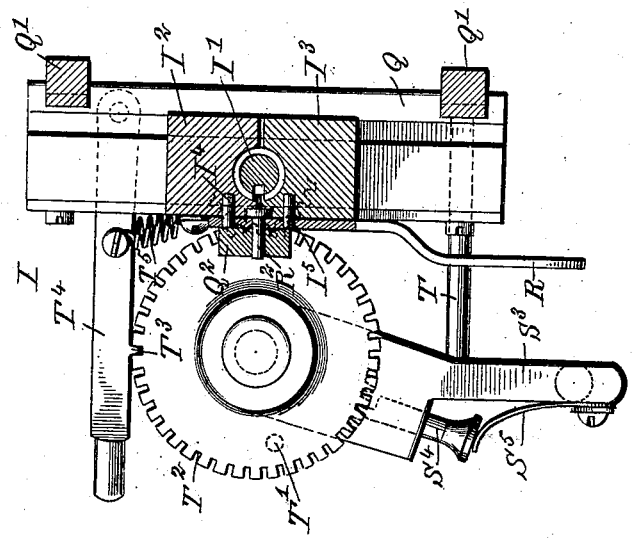
Figure 3:
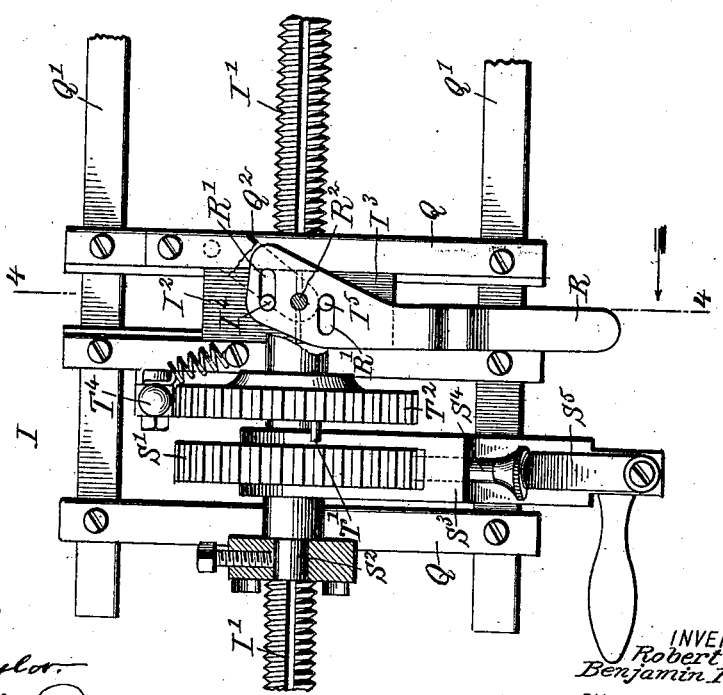

Figure 1 is a front elevation of the improvement, parts being in section; Fig. 2 is a transverse section of the same on the line 2—2 of Fig. 1; Fig. 3 is an enlarged plan view of the sign-spacing device; Fig. 4 is a transverse section of the same on the line 4—4 of Fig. 3; Fig. 5 is an enlarged plan view of the guide for a die, parts being in section; Fig. 6 is a like view of the same showing the parts in a different position; Fig. 7 is a side elevation of the same; Fig. 8 is an enlarged plan view of a part of the die-carrying belt; Fig. 9 is a similar view of another portion of the die-carrying belt, and Fig. 10 is an enlarged sectional side elevation of a part of the die-carrying belt and one of the dies in position. Fig. 11 is a plan view of a die made by the machine.

On a suitably constructed stand or frame A are mounted the flanged supporting wheels B, B', B² supporting a die carrier C on which are held dies D, each of which is provided at its die face D' with a raised letter, sign, numeral, character, ornament or the like, and any one of the said dies D on turning the carrier C can be brought into operative position over the plate or other article E to be engraved, the said plate resting on a supporting block F held in a bed G mounted to slide transversely on a carriage H adapted to slide longitudinally on the base A' of the frame A, the said carriage being controlled in its longitudinal movement by a spacing device I, under the control of the operator, for spacing the letters, signs, numerals, characters and ornaments on each line to be engraved on the plate E, the desired distance apart, the transverse adjustment of the plate E being by a screw rod J and nut J' (see Figs. 1 and 2) for spacing the several lines on the plate E the desired distance apart.

The die D in operative position at the time is held in a sectional guide K, to guide the die in its up and down movement, and the top of the die is adapted to be engaged by a plunger L mounted to slide vertically in a bearing A² forming part of the frame A. The plunger L is normally held in an uppermost position by a spring L', and the head L² of the plunger is engaged by a set screw L³ screwing in a cross bar N attached to the forward ends of a pair of transversely extending parallel arms N' fulcrumed at N² on a standard A³ of the main frame A. The arms N' are actuated by eccentric trunnions O' on the shaft O² of a hand lever O, under the control of the operator, the said shaft O² being journaled on a supporting arm P fulcrumed at its lower end at P' on the base A' of the frame A.

When the lever O is swung downward by the operator its eccentric trunnions O' cause a downward swinging of the arms N', to force the plunger L and the die D in operative position at the time, downward for the die to sink its die face D' (letter, sign, character, ornament or the like) into the face of the plate E, the downward movement of the lever O being limited by the set screw L³, which serves to regulate the depth the die face D' penetrates into the plate E.

The die carrier C is preferably in the form of a belt or band of steel or other suitable flexible material capable of being bent into circular form, as plainly illustrated in Figs. 1 and 2, the overlapping ends of the said belt or band being removably fastened together by the use of studs C' attached to one end of the belt or band and engaging key-hole slots C² on the other end of the belt or band, as shown in Fig. 9.

On the belt or band are riveted or otherwise secured sockets C³ each containing a die D held in place in the socket by the split shank C⁴ thereof, closed in firm engagement with the die D by a ring C⁵ driven onto the split and tapering shank C⁴, as plainly indicated in Figs. 1 and 10. The several sockets C³ are in alinement with each other and are spaced suitable distances apart, and alongside each die D is etched or otherwise produced on the side of the belt or band the same letter, sign, numeral, character or ornament as the die D.

It is understood that the dies D of one die carrier are assorted to form a complete font, that is, each set of dies on the die carrier contains, for instance, the capital and small letters of the alphabet, numerals from zero to 9, punctuation marks and other signs and characters usually required in engraving plates for various purposes.

Now it is evident that a number of die carriers having different sets of dies can be interchangeably used on the machine, to permit of engraving plates with letters, characters, numerals and signs of different forms and shapes as required.

Each of the die carriers is provided with an odd die D² (see Fig. 8) held in a socket C⁶ similar to the socket C³ but removably connected with the belt or band, the said socket being for this purpose provided at its sides with transversely extending guideways or grooves C⁷ engaging the side walls of a keyhole slot C⁸ formed in the belt or band between the socket C³ of a pair of adjacent regular dies, as plainly indicated in Fig. 8. By this arrangement any desired odd die may be slipped in position on the carrier C, for use whenever desired.

The supporting wheels B, B' and B² are flanged and arranged in a circle, to properly accommodate the circular die carrier C, the wheel B' being preferably arranged on the top, and the wheels B and B² at the sides, as shown in Figs. 1 and 2. The wheel B is preferably journaled on an arm A⁴ fulcrumed at A⁵ on the stand or frame A, to permit of swinging the arm A⁴ upwardly and inwardly, as plainly indicated in dotted lines in Fig. 1, to allow of conveniently placing the die carrier C in position on the other two wheels B' and B², and then swinging the arm A⁴ back into a horizontal position, to engage the die carrier C, with a view to hold the same properly in position. The arm A⁴ is locked in active position by a pin A⁶, as indicated in Fig. 1, this pin A⁶ being withdrawn to permit of swinging the arm A⁴ upwardly and inwardly when exchanging die carriers.

The block F rests in the grooved top of the bed G, and the plate E with the block F is clamped in place by a longitudially extending clamping bar F' held on screw rods F² screwing transversely in the front of the bed G, as shown in Figs. 1 and 2. Thus by screwing up the screw rods F², the block F and with it the plate E are securely clamped in position on the bed G during the engraving operation.

The screw rod J previously mentioned and employed for shifting the bed G transversely, is mounted to turn on the front of the bed G and screws in the nut J' secured to the carriage H, as illustrated in Fig. 2, so that when the operator applies a crank arm J² on the outer square end of the screw rod J and turns the crank arm, then the screw rod J screws in the nut J', thus moving the bed G rearwardly or forwardly according to the direction in which the crank arm J² is turned. By the arrangement described the succeeding lines to be engraved on the plate E are spaced apart the desired distance.

The spacing device I for shifting the carriage H, the bed G, block F and plate E longitudinally is arranged as follows, special reference being had to Figs. 1, 3 and 4: A screw rod I' is mounted to turn in one end of the carriage H (see Fig. 1) and the said screw rod I' is adapted to be engaged by the sections I² and I³ of a nut (see Fig. 4), and the said nut sections I² and I³ are mounted to slide transversely in suitable bearings Q attached to longitudinally extending bars Q' attached to or forming part of the base A' of the main frame A. The nut sections I² and I³ are provided on top with pins I⁴, I⁵ extending into elongated slots R' formed in a lever R under the control of the operator, and fulcrumed at R² on a bracket Q² attached to the guideways Q. Now when the several parts are in the position illustrated in the drawings then the nut sections I² and I³ are in engagement with the screw rod I', and when the latter is turned then the carriage H and the parts carried thereby are shifted longitudinally from the left to the right, the screw rod I' being turned correspondingly by the mechanism presently to be described in detail. When it is desired to move the carriage H quickly from the right to the left, the operator swings the lever R to the right into an open position, so as to move the nut sections I², I³ out of engagement with the screw rod I', to allow of shifting the carriage H from the right to the left by hand, to bring the carriage into a starting position. A pinion S is mounted to turn with and to slide lengthwise on the screw rod I'; and this pinion S is held against longitudinal movement on the guideway Q. The pinion S is in mesh with a gear wheel S' mounted to turn loosely on a shaft S² journaled on the guideway Q, and on this shaft S² is mounted to swing loosely a hand lever S³ under the control of the operator and provided with a sliding pawl S⁴ pressed on by a spring S⁵ and adapted to engage the teeth of the gear wheel S'. The swinging movement of the hand lever S³ is limited between the stop pins T and T', of which the stop pin T is secured on the guideway Q, and the stop pin T' projects from the face of a notched wheel T² mounted to rotate loosely on the shaft S². The notched wheel T² is adapted to be engaged at one of its notches by a lug T³ projecting from a hand lever T⁴ fulcrumed on the guideway Q and pressed on by a spring T⁵ for holding the lug T³ normally in engagement with one of the notches on the wheel T².

Now when the operator swings the hand lever T⁴ rearwardly the lug T³ moves out of engagement with the corresponding notch on the wheel T², so that the operator can turn the wheel T², to bring the stop pin T' nearer to or farther from the other stop pin T, and when the wheel T² has been moved to the desired position, then the operator releases the hand lever T⁴ to reëngage the lug T³ with a corresponding notch on the wheel T², to lock the latter against turning. Now by the arrangement described, the swinging movement of the hand lever S³ is limited between the stop pins T and T', and the distance between the stop pins can be varied to increase or decrease the stroke of the hand lever S³. Now when it is desired to turn the screw rod I' with a view to shift the carriage H from the left to the right, the distance between two letters, characters, ornaments, signs or the like to be engraved on the plate E, then the operator simply swings the lever S³ rearwardly from its position of rest on the stop pin T until the lever S³ strikes the other stop pin T'. Now during this turning movement the pawl S⁴ glides over the teeth of the gear wheel S'. When the operator returns the hand lever S³ from the stop pin T' to the stop pin T then the pawl S⁴ carries the gear wheel S' along, and in doing so the latter rotates the pinion S, whereby the screw rod I' is turned, and the latter screwing in the closed nut sections I², I³ travels longitudinally so that the carriage H and the parts supported thereon are moved from the left to the right. Now it is evident that for letters, signs, numerals, ornaments and the like of different width, the wheel T² is adjusted correspondingly to change the distance between the stop pins T, T', so that the movement given to the hand lever S³ is varied and consequently the screw rod I' is turned more or less to shift the carriage H the desired distance for properly spacing succeeding letters, numerals, signs, or ornaments in the same line on the plate E.

The guide K for guiding the die D in active position at the time, is arranged as follows, reference being had to Figs. 1, 2, 5, 6 and 7: The guide K consists essentially of notched wheels K', K' disposed horizontally and having their vertical axes coinciding and a guide member K² made approximately U shape and adapted to be moved toward or from the notched wheels K', K'. The notched wheels K', K' are journaled on a bracket K³ secured to the frame A, and the peripheries of the said wheels K', K' are provided with sets of registering notches K⁴, each set being different in shape from the next following one, to accommodate dies of different cross sections, as will be readily understood by comparison of Figs. 5 and 6. The wheels K', K' are also provided with sets of locking notches K⁵ arranged between adjacent sets of die notches K⁴, and the said locking notches K⁵ are adapted to be engaged by locking arms U to hold the wheels K', K' against turning. The locking arms U are fulcrumed on the bracket K³ and are pressed on in an outward direction by a spring U' secured at its middle to the bracket K³ (see Fig. 5), and the said locking arms U are normally held in engagement with the locking notches K⁵ by arms U² attached to a shaft U³ journaled in the bracket K³. The shaft U³ is provided with a handle U⁴ under the control of the operator, for turning the shaft U³, with a view to swing the arms U² in or out of engagement with the locking arms U. Thus when the handle U⁴ is swung forward, the arms U² are moved out of engagement with the locking arms U to allow the spring U' to swing the locking arms U outwardly to disengage the notched wheels K', K', thus allowing the operator to turn the said notched wheels K', K', to bring a desired set of die notches K⁴ to the front, for engagement by a correspondingly shaped die D. When this has been done the handle U⁴ is swung back to its former position, so that the arms U² engage the locking arms U and swing the same inward against the tension of the spring U' and into engagement with the locking notches K⁵, to lock the wheels K', K' in the adjusted position. The guide member K² is fulcrumed on the lower end of an arm V fulcrumed at its upper end on the bearing A² previously mentioned, and the arm V is engaged at its front face by a cam lever V' having its pivot V² removably held on the bearing A². A spring V³ on the arm V engages the bearing A² as well as the member K² (see Fig. 2), so that when the cam lever V' is swung downward into a closed position then the member K² is moved inward, to engage the front face of the die D held in the set of front registering notches K⁴ of the wheels K', K'.

By having the spring V³, the arm V as well as the member K² are yieldingly mounted to allow a ready sliding of the die D then in active position, and by permitting unlocking of the arm V and forward swinging thereof, the die D is readily released to allow of turning or shifting the die carrier C, to bring a desired die D into active position in the front notches $K^4$ of the wheels $K'$, $K'$, to be subsequently engaged by the member $K^2$ on again closing the cam lever $V'$, as previously explained.

Now when a die D is in position in the guide K it is in vertical alinement with the plunger L and its lower or die face $D'$ is directly above the plate E, and when the operator now swings the hand lever O downward then the eccentric trunnions $O'$ impart a downward swinging motion to the arms $N'$, to move the plunger L downward into engagement with the die D held in the guide K, so that the die D, on further movement downward of the hand lever O, is moved likewise downward and with its die face $D'$ in engagement with the face of the plate E, to cut into the said face and thus produce the sunken letter, numeral, character, sign, ornament or the like in the plate E corresponding to the face $D'$.

It is understood that when the die D is forced downward as described, the die carrier C owing to its flexible nature yields at the bottom with the die, and when the operator subsequently swings the handle O upward and the plunger L is raised by its spring $L'$, then the die D returns to its normal position owing to the return of the flexible carrier C to normal position.

After the desired die has been forced into engagement with the plate E and released, as previously described, and it is desired to form another sunken letter, numeral, sign, character or ornament in the plate E adjacent to the previously made character, the operator first swings the cam lever $V'$ upward to release the die in the guide K and to permit turning of the carrier C until the next desired die is in operative position in the wheels $K'$, $K'$ of the guide K. When this has been done the hand lever $V'$ is again swung downward, to move the guide member $K^2$ in engagement with the front of the die, and then the operator gives a full stroke to the hand lever $S^3$ to shift the carriage H from the left to the right, after which the lever O is brought down, as previously described, to cause the plunger L to force the die D downward for forming another sunken letter, numeral, character, sign, ornament or the like in the plate E.

The above described operation is repeated as often as necessary, to form a desired line of sunken letters in the plate E, and when it is desired to form another line of sunken letters in the plate E, the operator turns the screw rod J by the use of the handle $J^2$, to shift the bed G, block F and plate E transversely the desired distance between the two lines of sunken letters. The above described operation is then repeated for forming sunken letters in the second line.

When it is desired to shift the carriage H quickly to starting position after a line of sunken letters is finished, it is only necessary for the operator to swing the lever R to the right to open the nut sections $I^2$, $I^3$, so that the screw rod $I'$ and consequently the carriage H are free to be moved from the right to the left the desired distance, after which the lever R is swung back to its normal position to close the nut sections $I^2$, $I^3$ onto the screw rod $I'$. The bed G is then shifted, as previously explained, in a transverse direction by the operator turning the crank arm $J^2$.

When it is desired to exchange one die carrier for another, the pivot $V^2$ is withdrawn to permit removal of the cam lever $V'$, so that the arm V and with it the guide member $K^2$ can be swung upward, to allow convenient removal of the die carrier C and replacing it by another one, after which the arm V is swung downward back to active position and the cam lever $V'$ and pivot pin $V^2$ are replaced.

It is understood that it is very essential that the dies D be brought successively into the same position in the guide K, to insure proper alinement of the letters or other characters in a line, and it is also essential that the dies be properly guided in their up and down movement during the engraving operation.

By the arrangement described a large number of sunken letters can be readily produced on plates or like articles in a comparatively short time and with the utmost accuracy and without the use of skilled labor.

Having thus described our invention, we claim as new and desire to secure by Letters Patent:

1. An engraving machine, comprising a die carrier provided with a plurality of sockets, each provided with a split shank, dies in the sockets, a ring encircling each of the sockets for clamping the split portion on the die, means whereby the carrier may be shifted to bring any one of the dies into operative position, and means for forcing the die in operative position at the time into engagement with the plate to be engraved.

2. An engraving machine comprising a die carrier provided with a plurality of sockets, each of said sockets having a split shank, a die in each of the sockets, a ring encircling the split shank for clamping said shank on the die, guiding means for receiving and guiding one of the dies during the engraving operation, and means for forcing the die held in the guiding means at the time into engagement with the plate to be engraved.

3. An engraving machine comprising a die carrier composed of an endless flexible band, a plurality of sockets in connection with the band, dies in the sockets, means whereby the band may be shifted to bring any of the dies into operative position, a guide for receiving the die in operative position, and a plunger for engaging the die in the guide to force the same into contact with the plate to be engraved.

4. In an engraving machine, a die carrier comprising an endless flexible band arranged in a circle, a plurality of sockets in connection with the band, and a die mounted in each of the sockets.

5. An engraving machine provided with a die carrier comprising a flexible belt, and die holders attached to the said belt and spaced apart, each die holder being adapted to receive and hold a die, each die holder having locking means for locking the die rigidly in place in the holder.

6. An engraving machine provided with a die carrier comprising a belt of flexible material, sockets held on the said belt and spaced apart, each socket having a split shank and being adapted to receive a die, and a closing ring for the said shank to close the members onto the said die to lock the latter in place in the socket.

7. An engraving machine provided with a die carrier comprising a flexible belt, a plurality of fixed sockets rigidly attached to the said belt and each being adapted to carry a die, and a removable socket removably held on the said belt and adapted to carry an odd die.

8. A device of the class described, comprising a frame, flanged supporting wheels journaled thereon, an endless carrier supported on the wheels, a plurality of radially movable dies supported by the carrier, a carriage, means for moving the carriage transversely of the carrier, means for moving the carriage by intermittent steps in the direction of travel of the carrier, said carriage being provided with a bed for supporting the plate to be engraved, a plunger mounted for sliding movement in the frame for engaging the die in operative position, means for depressing the plunger, and a guide for the die, said guide comprising spaced wheels provided with notches for receiving the die, and means for retaining the die in the notches.

9. A device of the class described, comprising a revolubly supported endless die carrier, a plurality of radially movable dies supported by the carrier, a carriage for supporting the work, means for moving the carriage transversely of the carrier, means for moving the carriage by intermittent steps in the direction of travel of the carrier, a plunger for engaging the die in operative position, to force it into engagement with the work, and a guide for the die, said guide comprising spaced wheels provided with notches for receiving the die, and means for retaining the die in the notches.

10. An engraving machine comprising a bed for the plate to be engraved to rest on, a die carrier carrying a plurality of spaced and assorted dies and adapted to be shifted to bring any one of the dies in operative position over the said plate, a plunger for engaging the die in operative position at the time to force the die into engagement with the said plate, a guide for the die, said guide comprising spaced wheels provided with peripheral notches for receiving the die, means for retaining the die in the notches, and a line-spacing device for the said bed, to shift the latter transversely a distance between two lines to be engraved on the plate.

11. An engraving machine comprising a bed for the plate to be engraved to rest on, a die carrier carrying a plurality of spaced and assorted dies and adapted to be shifted to bring any one of the dies in operative position over the said plate, a plunger for engaging the die in operative position at the time, to force the die into engagement with the said plate, a lever for imparting movement to the said plunger in one direction, a spring for returning the said plunger and a guide for the die, said guide comprising spaced wheels having peripheral notches for receiving the die, and means engaging the die for retaining it in the notches.

12. An engraving machine comprising a bed for the plate to be engraved to rest on, supporting wheels arranged in a circle, an endless flexible belt carrying a plurality of spaced dies and supported on the said wheels to permit of shifting the belt to bring any one of the said dies into operative position over the said plate, a plunger for engaging the die in operative position at the time to force the die in contact with the plate, and a guide for receiving and guiding the die in operative position at the time, the said guide being made in sections to permit of opening the guide for the admission and removal of a die.

13. An engraving machine comprising a bed for the plate to be engraved to rest on, supporting wheels arranged in a circle, an endless flexible belt carrying a plurality of spaced dies and supported on the said wheels, to permit of shifting the belt to bring any one of the said dies into operative position over the said plate, a plunger for engaging the die in operative position at the time to force the die in contact with the plate, and a guide for receiving and guiding the die in operative position at the time, the said guide being made in sections to permit of opening the guide for the admission and removal of a die, one of the guide sections being formed of notched wheels and the other guide section being movable toward and from the said wheels.

14. An engraving machine comprising a bed for the plate to be engraved to rest on, supporting wheels arranged in a circle, an endless flexible belt carrying a plurality of spaced dies and supported on the said wheels, to permit of shifting the belt to bring any one of the said dies into operative position over the said plate, a plunger for engaging the die in operative position at the time, to force the die in contact with the plate, a guide for receiving and guiding the die in operative position at the time, the said guide being made in sections to permit of opening the guide for the admission and removal of a die, one of the guide sections being formed of notched wheels and the other guide section being movable toward and from the said wheels, a lever on which the said movable guide section is hung, and a cam lever for actuating the said lever.

15. An engraving machine comprising a bed for the plate to be engraved to rest on, a die carrier carrying a plurality of spaced and assorted dies and adapted to be shifted to bring any one of the dies in operative position over the said plate, a plunger for engaging the die in operative position at the time, to force the die into engagement with the said plate, a lever for imparting movement to the said plunger in one direction, a spring for returning the said plunger, and an adjusting device for adjusting the position of the said plunger.

16. An engraving machine comprising a bed for the plate to be engraved to rest on, a die carrier carrying a plurality of spaced and assorted dies and adapted to be shifted to bring any one of the dies in operative position over the said plate, a plunger for engaging the die in operative position at the time, to force the die into engagement with the said plate, and a sign-spacing device for the said bed, to shift the latter longitudinally in the direction of the line to be engraved on the plate, the said sign-spacing device having adjustable means to vary the throw of the said sign-spacing device.

17. An engraving machine comprising a die carrier carrying a plurality of dies and capable of being shifted to bring any one of the dies into operative position over the plate to be engraved, means for moving the die in operative position at the time into engagement with the plate, a bed for supporting the said plate, a carriage mounted to slide longitudinally and on which the said bed is mounted to slide transversely, a longitudinally extending screw rod mounted to turn in the said carriage, a fixed nut engaging the said screw rod, a pinion mounted to turn with and to slide on the said screw rod, a gear wheel in mesh with the said pinion, and a hand lever carrying a pawl engaging the said gear wheel to turn the latter.

18. An engraving machine comprising a die carrier carrying a plurality of dies and capable of being shifted to bring any one of the dies into operative position over the plate to be engraved, means for moving the die in operative position at the time into engagement with the plate, a bed for supporting the said plate, a carriage mounted to slide longitudinally and on which the said bed is mounted to slide transversely, a longitudinally extending screw rod mounted to turn on the said carriage, a fixed nut engaging the said screw rod, a pinion mounted to turn with and to slide on the said screw rod, a gear wheel in mesh with the said pinion, a hand lever carrying a pawl engaging the said gear wheel to turn the latter, and manually controlled means for limiting the swinging motion of the said hand lever.

19. An engraving machine comprising a die carrier carrying a plurality of dies and capable of being shifted to bring any one of the dies into operative position over the plate to be engraved, means for moving the die in operative position at the time into engagement with the plate, a bed for supporting the said plate, a carriage mounted to slide longitudinally and on which the said bed is mounted to slide transversely, a longitudinally extending screw rod mounted to turn in the said carriage, a fixed nut engaging the said screw rod, a pinion mounted to turn with and to slide on the said screw rod, gear wheel in mesh with the said pinion, a lever carrying a pawl engaging the said gear wheel to turn the latter, and stops for limiting the swinging motion of the said hand lever, one of the stops being fixed and the other adjustable.

20. An engraving machine comprising a die carrier carrying a plurality of dies capable of being shifted to bring any one of the dies into operative position over the plate to be engraved, means for moving the die in operative position at the time into engagement with the plate, a bed for supporting the said plate, a carriage mounted to slide longitudinally and on which the said bed is mounted to slide transversely, a longitudinally extending screw rod mounted to turn in the said carriage, a fixed nut engaging the said screw rod and made in sections adapted to be opened and closed, a pinion mounted to turn with and to slide on the said screw rod, a gear wheel in mesh with the said pinion, and a hand lever carrying a pawl engaging the said gear wheel to turn the latter.

21. A device of the class described, comprising a die carrier provided with a plurality of dies, a plunger for engaging the die in operative position, means for operating the plunger, and a guide for the die, said guide comprising spaced wheels provided with peripheral notches for receiving the die, and means for retaining the die in the notches.

22. An engraving machine, comprising a die carrier consisting of a flexible band, dies supported by the band, guiding means for receiving and guiding the dies during the engraving operation, a plunger for forcing the die into engagement with the plate to be engraved, and means whereby said dies may yield in the guiding means when engaged by the plunger.

23. An engraving machine, comprising a flexible die carrier, dies supported by the carrier, means whereby to shift the carrier to bring any one of the dies into operative position, means for receiving and guiding the die in operative position during the engraving operation, a plunger for operating the die, and means permitting the dies to yield in the guiding means when engaged by the plunger.

24. An engraving machine comprising a die carrier composed of an endless flexible band, a plurality of sockets in connection with the band, dies in the sockets, means whereby the band may be shifted to bring any one of the dies into operative position, a guide for receiving the die in operative position, a plunger for engaging the die in the guide to force the same into contact with the plate to be engraved, and means for permitting the die to yield in the guiding means.

In testimony whereof we have signed our names to this specification in the presence of two subscribing witnesses.

ROBERT TURNER.
BENJAMIN R. CORLEY.

Witnesses:
   THEO. G. HOSTER,
   EVERARD B. MARSHALL.